United States Patent
Davis et al.

(10) Patent No.: US 9,509,700 B2
(45) Date of Patent: Nov. 29, 2016

(54) ACCESS CONTROL LIST LOCKOUT PREVENTION SYSTEM

(71) Applicant: Dell Products L.P., Round Rock, TX (US)

(72) Inventors: Kevin Eugene Davis, Cibolo, TX (US); Patricia Tims Stone, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 119 days.

(21) Appl. No.: 14/249,173

(22) Filed: Apr. 9, 2014

(65) Prior Publication Data

US 2015/0295932 A1 Oct. 15, 2015

(51) Int. Cl.
*G06F 21/60* (2013.01)
*H04L 29/06* (2006.01)

(52) U.S. Cl.
CPC .......... *H04L 63/101* (2013.01); *G06F 21/604* (2013.01); *H04L 63/0227* (2013.01); *H04L 63/20* (2013.01)

(58) Field of Classification Search
CPC ..................................................... H04L 63/101
See application file for complete search history.

(56) References Cited

U.S. PATENT DOCUMENTS

| | | | | |
|---|---|---|---|---|
| 7,636,937 | B1 * | 12/2009 | Bhattacharya ...... | H04L 63/0263 709/223 |
| 7,925,666 | B1 * | 4/2011 | Johnson et al. ............... | 707/781 |
| 8,074,276 | B1 * | 12/2011 | Beloussov .............. | G06F 21/56 713/188 |
| 8,528,041 | B1 * | 9/2013 | Haney .................. | H04L 63/101 713/151 |
| 9,246,941 | B1 * | 1/2016 | Gibson ................... | H04L 63/20 |
| 2004/0128537 | A1 * | 7/2004 | Zurko ................. | G06F 21/6218 726/1 |
| 2006/0164984 | A1 * | 7/2006 | Rao et al. ...................... | 370/230 |
| 2007/0006282 | A1 * | 1/2007 | Durham et al. .................. | 726/2 |
| 2009/0007218 | A1 * | 1/2009 | Hubbard .......................... | 726/1 |
| 2014/0064149 | A1 * | 3/2014 | Frey .................... | H04L 41/0869 370/255 |
| 2014/0379915 | A1 * | 12/2014 | Yang et al. .................... | 709/225 |
| 2015/0200949 | A1 * | 7/2015 | Willhite et al. .................... | 726/1 |

OTHER PUBLICATIONS

Oracle "System Administration Guide: Security Services", 2010, 1 page.*
"Trusted Solaris User's Guide", 2010, 1 page.*

* cited by examiner

*Primary Examiner* — Kenneth Chang
*Assistant Examiner* — Thaddeus Plecha
(74) *Attorney, Agent, or Firm* — Haynes and Boone, LLP

(57) ABSTRACT

An access control list lockout prevention system includes a network. A first administrator Information Handling System (IHS) is coupled to the network. A networking device is communicatively connected to the first administrator IHS through the network. The networking device is configured to receive an access control list instruction from the first administrator IHS. The networking device then determines that at least one administrator IHS that is communicatively connected to the networking device will lose access to the networking device in response to execution of the access control list instruction. In response to determining that the at least one administrator IHS will lose access to the networking device in response to execution of the access control list instruction, the networking device provides a warning message for display on the first administrator IHS.

20 Claims, 8 Drawing Sheets

ACCESS CONTROL LIST LOCKOUT PREVENTION SYSTEM

BACKGROUND

The present disclosure relates generally to information handling systems, and more particularly to a lockout prevention system for use in providing access control lists on information handling systems.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHSs such as, for example, networking devices (e.g., switch devices, router devices, etc.), are configurable with access control lists that include rules that may be applied to interfaces associated with the networking device (e.g., port numbers, Internet Protocol (IP) addresses, etc.) and that define the entities (e.g., user IHSs, networks, etc.) that are permitted to access the networking device through those interfaces. However, the use of access control lists can raise a number of issues. For example, it is possible (and relatively common) for a network administrator to "lock" their administrator IHS out of accessing a networking device when configuring an access control list on that networking device. Typically, this occurs when the network administrator applies an access control list to the networking device that includes an interface that their administrator IHS is using to access the networking device without realizing that the access control list does not permit their administrator IHS to access the networking device through that interface. Once that access control list is applied to the networking device, that networking device must then be rebooted or reset in order to allow the network administrator to use their administrator IHS to access the networking device. Because such networking devices are typically physically remote from the network administrator, that network administrator typically must then contact another administrator or user to reboot the networking device such that their administrator IHS can access it. Such relatively common mistakes involved in the application of access control lists result in wasted time, losses in productivity, and embarrassment for the network administrator.

Accordingly, it would be desirable to provide an access control list lockout prevent system.

SUMMARY

According to one embodiment, an access control list lockout prevention system includes a network; a networking device that is coupled to the network; and a first administrator Information Handling System (IHS) that is communicatively connected to the networking device through the network, wherein the networking device is configured to: receive an access control list instruction; determine that at least one administrator IHS that is communicatively connected to the networking device will lose access to the networking device in response to execution of the access control list instruction; and provide a warning message for display on the first administrator IHS in response to determining that the at least one administrator IHS will lose access to the networking device in response to execution of the access control list instruction.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
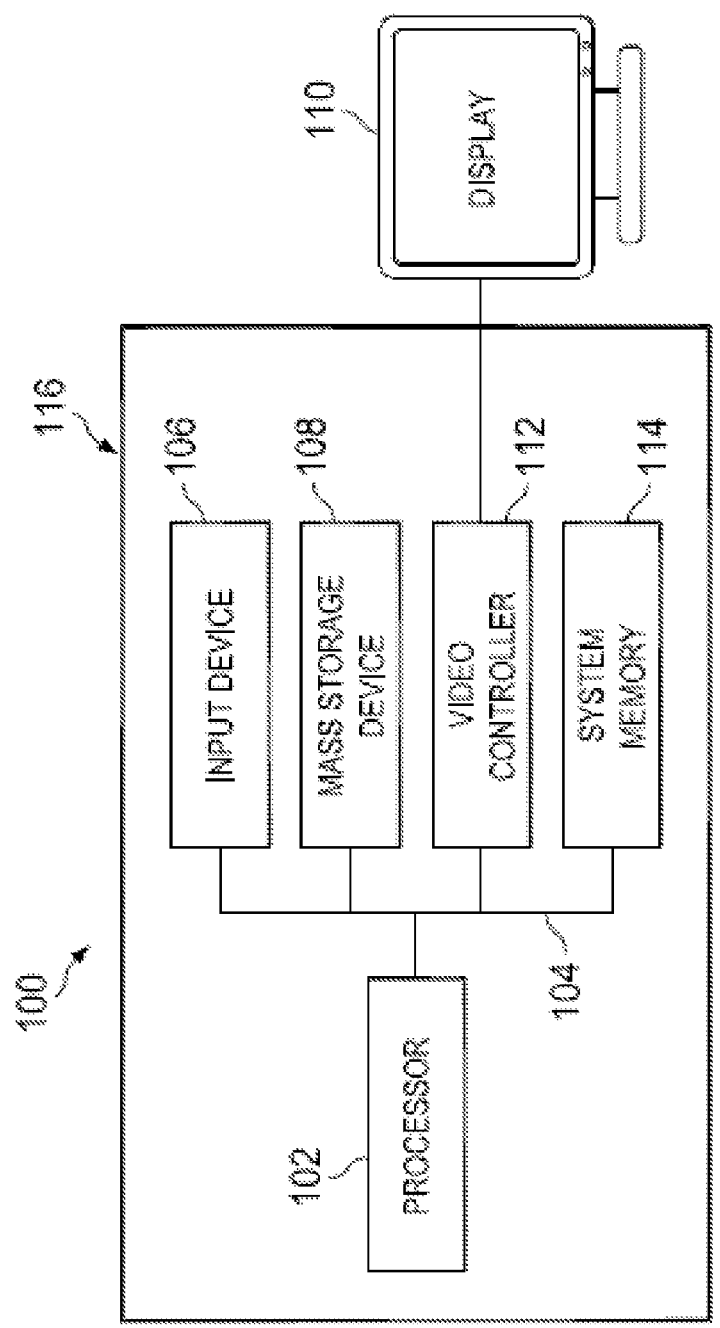
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
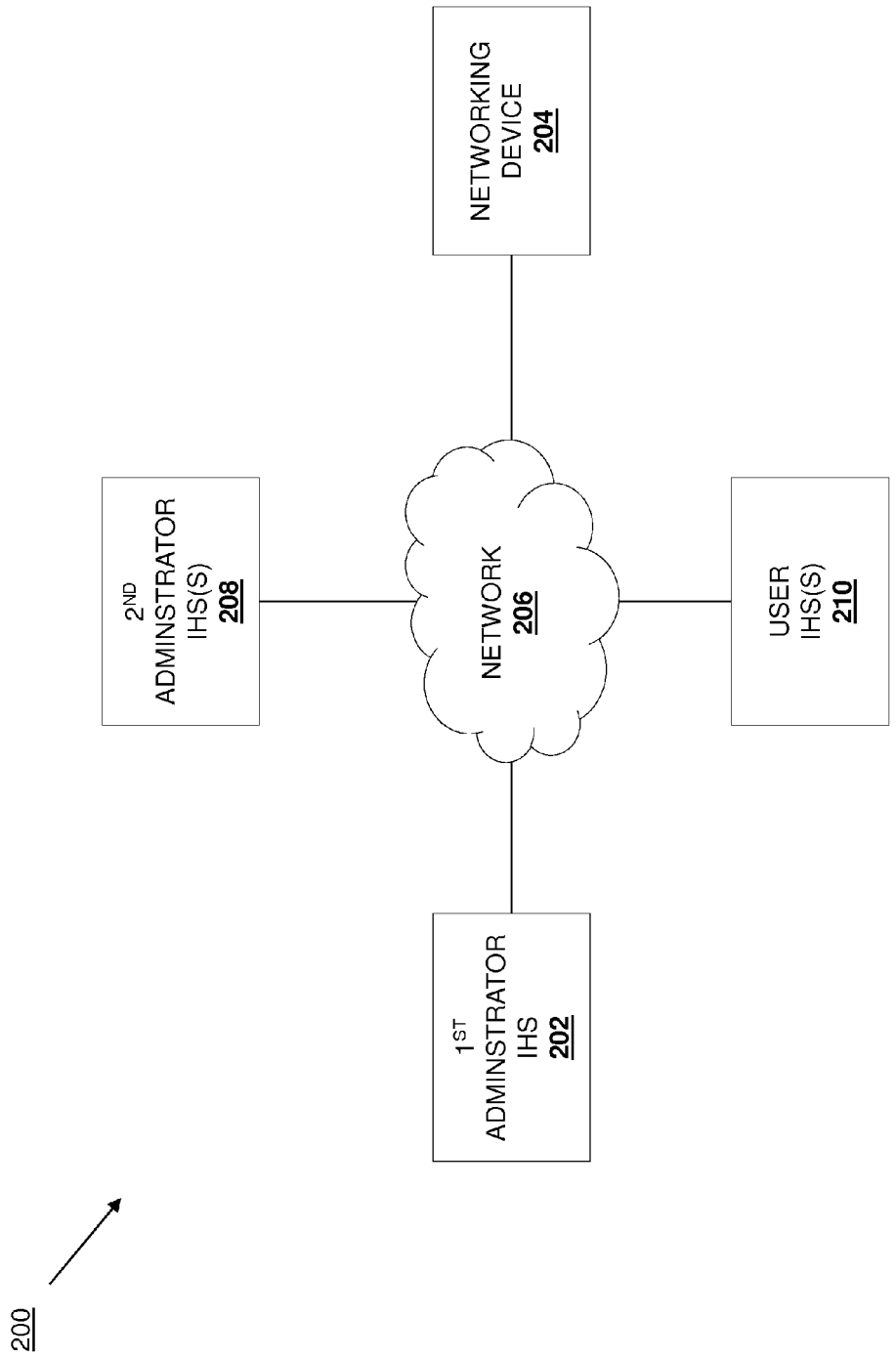
FIG. 2 is a schematic view illustrating an embodiment of an access control list lockout prevention system.

Referring now to FIG. 2, an embodiment of an access control list lockout prevention system 200 is illustrated. The access control list lockout prevention system 200 includes a first administrator IHS 202, which may be the IHS 100 discussed above with reference to FIG. 1 and/or include some or all of the components of the IHS 100, that is communicatively coupled to a networking device 204 through a network 206 (e.g., a Local Area Network (LAN), the Internet, and/or a variety of other networks known in the art). In an embodiment, the networking device 204 may be the IHS 100 discussed above with reference to FIG. 1 and/or include some or all of the components of the IHS 100, and in specific embodiments may include a switch IHS, a router IHS, and/or a variety of other layer 3 networking IHSs known in the art. In some embodiments, one or more second administrator IHSs 208, each of which may be the IHS 100 discussed above with reference to FIG. 1 and/or include some or all of the components of the IHS 100, are communicatively coupled to the networking device 204 through the network 206. Furthermore, in some embodiments, one or more user IHSs 210, each of which may be the IHS 100 discussed above with reference to FIG. 1 and/or include some or all of the components of the IHS 100, are communicatively coupled to the networking device 204 through the network 206.

While in the embodiments discussed below, the access control list lockout prevention system 200 is discussed as operating to prevent lockouts of the first administrator IHS 202 or the one or more second administrator IHSs 208 that may be providing data traffic that terminates on the networking device 204 (e.g., configuration data traffic for the networking device 204) during the provision of access control list instructions and/or access control lists, one of skill in the art in possession of the present disclosure will recognize that the access control list lockout prevention system 200 may be beneficial to prevent lockouts of any system that may provide data traffic handled by the networking device 204, including administrator IHSs 202 and 208, user IHSs 210, and/or other IHSs known in the art. As such, the prevention of the lockout of administrator IHSs 202 and/or 208 providing configuration data traffic to the networking device 204 is simply provided below as an example of the operation of the access control list lockout prevention system 200, and the prevention of the lockout of other types of IHSs providing other types of data traffic to other types of devices is envisioned as falling within the scope of the present disclosure.

Figure 3:
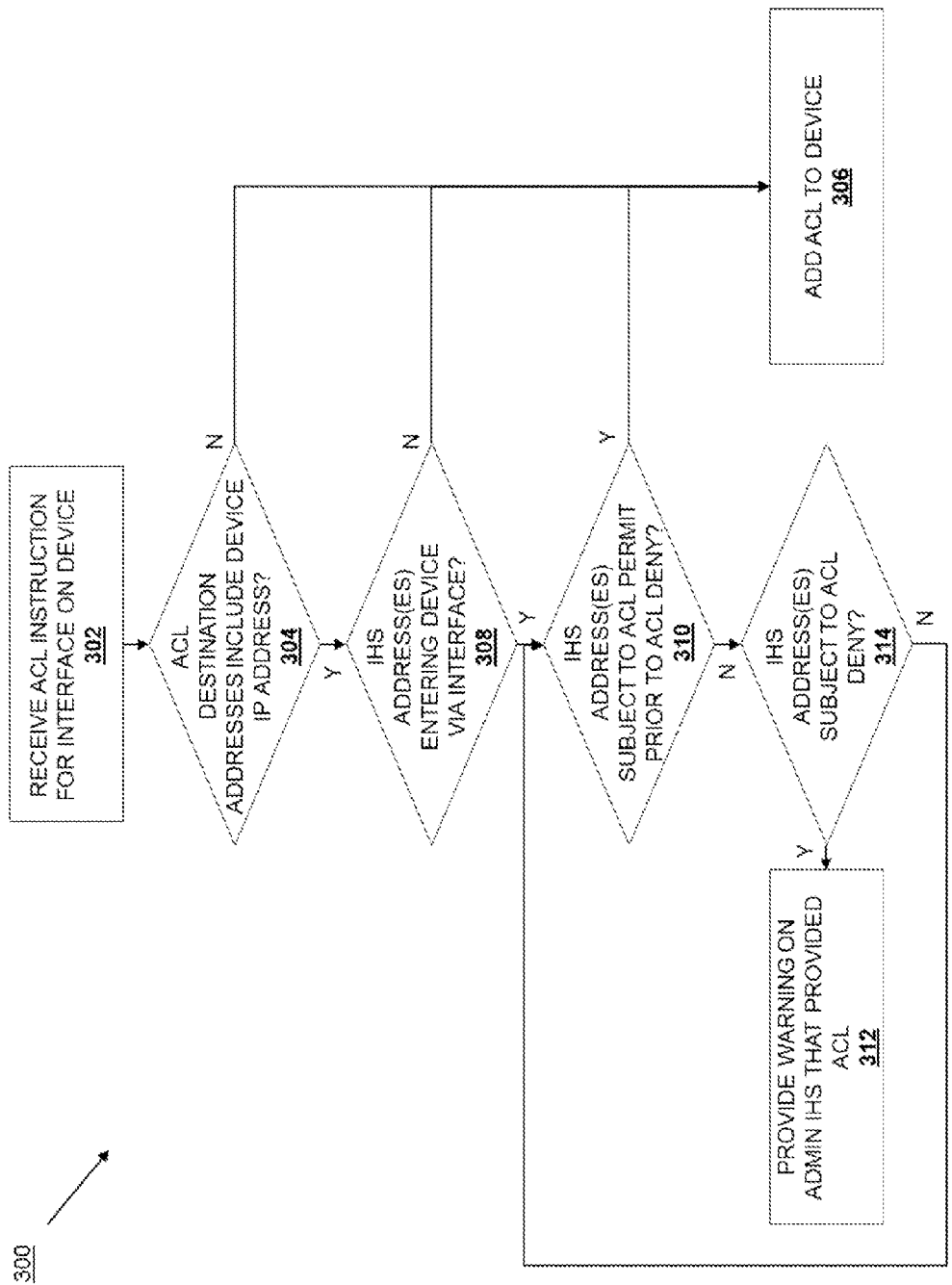
FIG. 3 is a flow chart illustrating an embodiment of a method for providing an access control list.
Figure 4:
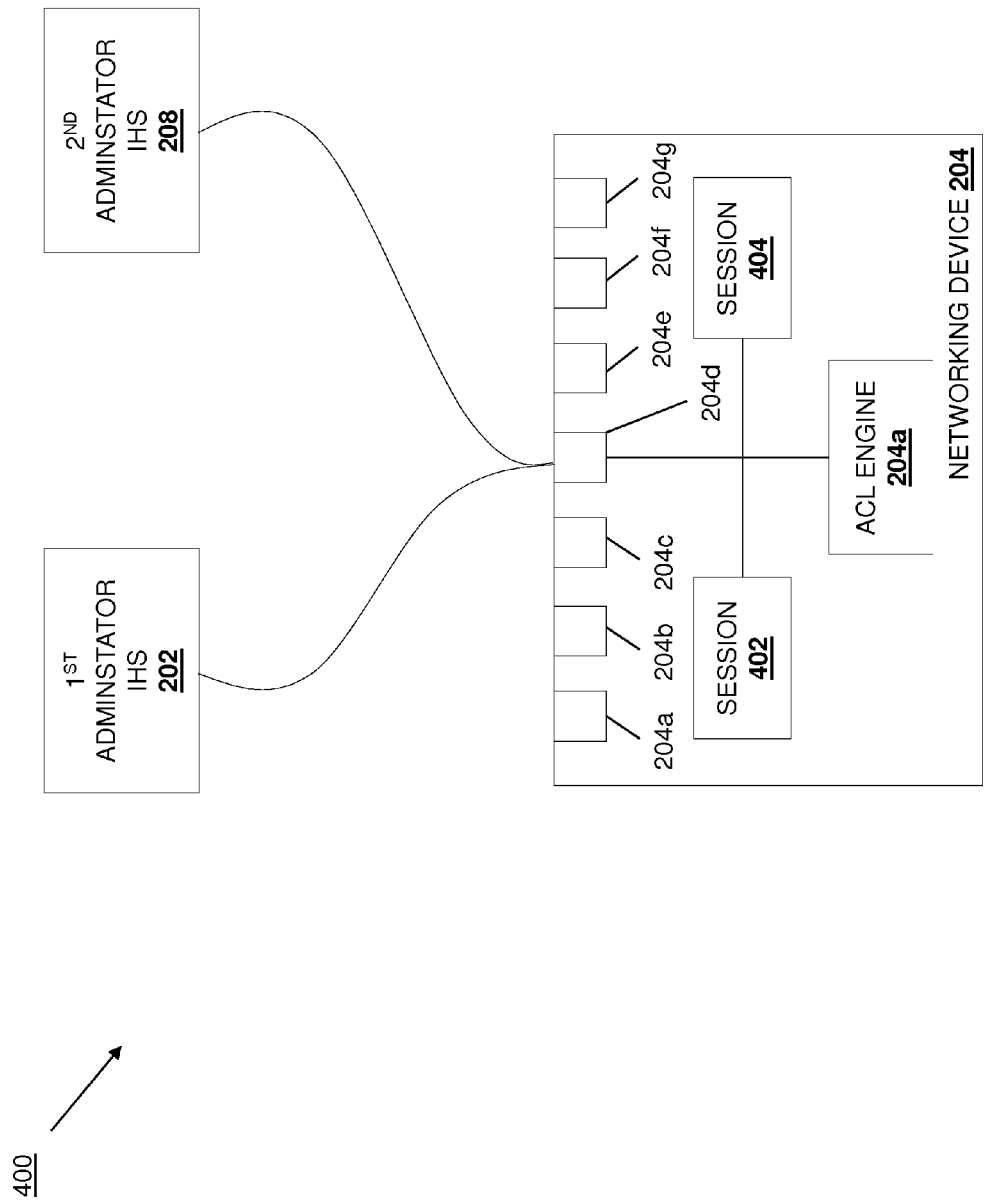
FIG. 4 is a schematic view illustrating an embodiment of an access control list being provided on a networking IHS according to the method of FIG. 3.

Referring now to FIGS. 3 and 4, an embodiment of a method 300 for providing access control lists is illustrated. FIG. 4 illustrates an embodiment 400 of the access control list lockout prevention system 200 prior to or during the performance of the method 300. The networking device 204 includes a plurality of interfaces 204a, 204b, 204c, 204d, 204e, 204f, and 204g which may be, for example, ports, inputs, connectors, and/or a variety of other interfaces known in the art. In the illustrated embodiment 400 of the access control list lockout prevention system 200, each of the first administrator IHS 202 and the second administrator IHS 208 are communicatively coupled to the interface 204d (e.g., through the network 206 and/or other networking devices) and providing configuration data traffic that terminates at the networking device 204. The networking device 204 includes a memory system (not illustrated, but which may be the system memory 114 discussed above with reference to FIG. 1) that includes instructions that, when executed by a processing system in the networking device 204 (not illustrated, but which may be the processor 102 discussed above with reference to FIG. 1), cause the processing system provide an access control list engine 204a that is configured to provide a session 402 to the first administrator IHS 202, a session 208 to the second administrator IHS 208, to perform any of the functions of the access control list engines discussed below, and/or perform any other networking functions known in the art. While the access control list engine 204a is illustrated and described below as being located in the networking device 204, the access control list engine could be instead located in the first administrator IHS 202, and one of skill in the art in possession of the present disclosure will recognize how such a first administrator IHS 202 access control list engine could be configured to communicate with the networking device 204 to perform the functions discussed below for the access control list engine 204a while remaining within the scope of the present disclosure.

In one example, either or both of the first administrator IHS 202 and the second administrator 208 may log into the networking device 204 (e.g., via a virtual teletype (VTY) connection using the Telnet interface and protocol, the Secure Shell (SSH) interface and protocol, and/or a variety of other interfaces and protocols known in the art) via their communicative connections to the networking device 204 to establish the respective sessions 402 and/or 404 such that they may, for example, configure and/or modify the settings of the networking device. In the example discussed below, the first administrator IHS 202 has logged into the networking device 204 and established the session 402 to configure a layer 3 access control list.

Figure 5:
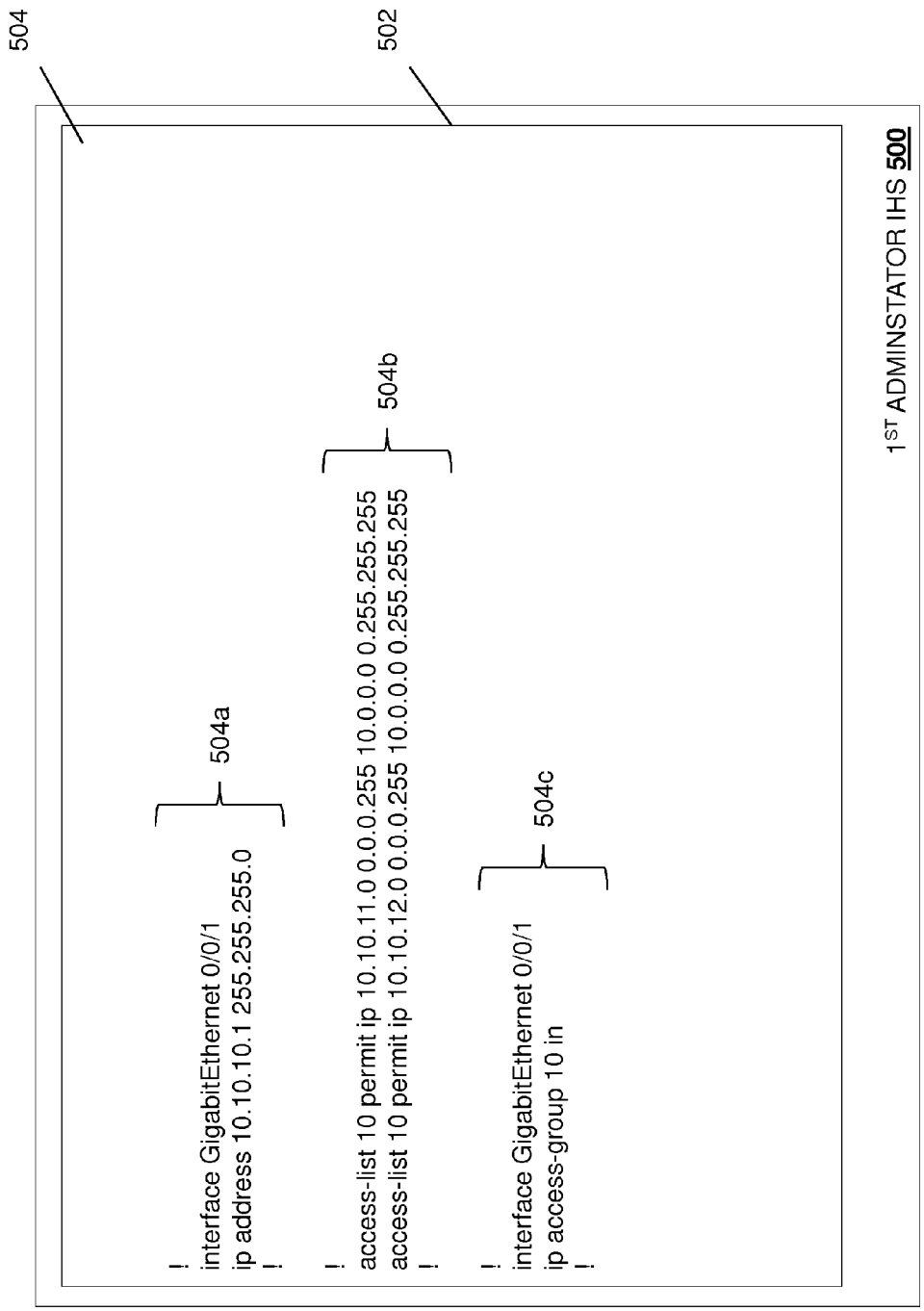
FIG. 5 is a screen shot view illustrating an embodiment of an administrator IHS being used to provide an access control list.

Referring now to FIGS. 2, 3, 4, and 5, the method 300 begins at block 302 where an access control list instruction is received for an interface on the networking device. In an embodiment, an access control list instruction or access control list may be received by the access control list engine 204a in the networking device 204 through the network 206 from an administrator user via the first administrator IHS 202. FIG. 5 illustrates a first administrator IHS 500 which may be for example, the first administrator IHS 202 discussed above and that includes a display device 502 displaying an access control list input screen 504. The access control list input screen 504 illustrates an embodiment of access control list instructions that may be provided by an administrator user that is configuring an access control list on the networking device 504, and may define, specify, or otherwise include the protocols, Internet Protocol (IP) addresses, actions (e.g., permit, deny, log, etc.), and/or a variety of other characteristics known in the art for access control entries in access control lists. In the examples provided below, the first administrator IHS 202/500 includes an IP address of 10.10.20.33 and the networking device 204 includes an IP address of 10.10.10.1 for the sake of discussing one specific example of the performance of the method 300.

The access control list input screen 504 includes a networking device address configuration section 504a that operates to configure the IP address of the networking device 204 on the interface 204d (e.g., also referred to herein as interface "GigabitEthernet 0/0/1"). The access control list input screen 504 also includes an access control list 504b. As would be understood by one of skill in the art, the statements in the access control list 504b of the illustrated embodiment are inverse masking statements in which, for each respective bit in the IP address provided, zero's require a match and one's do not. As such, the first (i.e., top) permit statement in the access control list 504b of the illustrated embodiment ("access-list 10 permit ip 10.10.11.0 0.0.0.255 10.0.0.0 0.255.255.255"), once executed or applied, would operate to permit IP addresses beginning with 10.10.11.x. Similarly, the second (i.e., bottom) permit statement in the access control list 504b of the illustrated embodiment ("access-list 10 permit ip 10.10.12.0 0.0.0.255 10.0.0.0 0.255.255.255"), once executed or applied, would operate to permit IP addresses beginning with 10.10.12.x. Furthermore, while not explicitly illustrated on access control list input screen 504, one of skill in the art would also recognize that the access control list 504b of the illustrated embodiment includes an implicit deny statement following the second (i.e., bottom) permit statement in the access control list 504b that, once executed or applied, would operate to deny any IP addresses not permitted by the permit statements.

The access control list input screen 504 also includes an access control list application instruction 504c that operates to apply the access control list 504b to inbound traffic (e.g., "ip access group 10 in") on the interface 204d (e.g., interface "GigabitEthernet 0/0/1"). As is known in the art, an access control list may be applied to one or more interfaces on a networking device along with a specification of direction (i.e., to inbound data traffic or outbound data traffic), and thus the application of the access control list 504b to inbound traffic on a single interface 204d in FIG. 5 is provided merely as an example, and the application of access control lists to more than one interface and in a different direction are envisioned as falling within the scope of the present disclosure. Furthermore, while an example of an access control list including inverse masking permit statements (and an implicit deny statement) that is applied to a single interface on a networking device is provided, a wide variety of access control lists using, for example, normal masking statements, explicit deny statements, log statements, and/or a variety of other access control list features known in the art are envisioned as falling within the scope of the present disclosure.

At block 302, the administrator user of the first administrator IHS 202 uses an input device (e.g., selecting an "enter" key on a keyboard following the provision of the access control list application instruction 504c) to provide an instruction to execute the access control list application instruction 504c such that the access control list 504b is applied to the interface 204d of the networking device 204 specified in the networking device address configuration section 504a. In conventional access control list systems, such an instruction to execute the access control list application instruction 504c would cause the administrator IHS 202 and networking device 204 to operate in the session 402 to execute the access control list application instruction 504c and apply the access control list 504b on the interface 204d of the networking device 204 in the networking device address configuration section 504a. Using the example introduced above where the first administrator IHS 202 has an IP address of 10.10.20.33, the access control list 504b permits IP addresses beginning with 10.10.11.x and 10.10.12.x and denies all other IP addresses, and the execution of the access control list application instruction 504c and application of the access control list 504b on the interface 204d of the networking device 204 in the networking device address configuration section 504a in such conventional systems would cause the first administrator IHS 202 to become "locked out" or to lose access to the networking device 204. The access control list lockout prevention system 200 and method 300 of the present disclosure operates to prevent such lockouts or losses of access by analyzing access control lists, the networking devices to which they are being applied, and the IHSs that are communicatively connected to those networking devices, and then warning a user if the access control list they are trying to apply will cause a lockout or loss of access prior to the execution of its access control list instruction or application of that access control list on a networking device. For example, prior to the operating system of the networking device 204 activating the access control list 504b on the interface 204d, the access control list engine 204a in the networking device 204 may perform the functions of the method 300 discussed below to determine whether administrator IHSs and/or other user IHSs that are communicatively connected to the networking device 204 will lose access to the networking device 204 and, if so, warn the administrator user providing the access control list of such.

Following the receiving of the access control list instruction at block 302, the method 300 proceeds to decision block 304 where it is determined whether destination addresses in the access control list include an IP address of the networking device. In an embodiment, the access control list engine 204a in the networking device 204 retrieves the IP addresses associated with the interfaces 204a-g on the networking device 204 and compares those IP addresses to the destination addresses that are included in the access control list 504b. For example, both the first (i.e., top) permit statement and the second (i.e., bottom) permit statement in the access control list 504b of the illustrated embodiment include the same destination address ("10.0.0.0 0.255.255.255"). One of skill in the art will recognize that these destination addresses will match many networking device IP address that begins with 10.x.x.x. As discussed above, in our example the networking device 204 includes an IP address of 10.10.10.1 and, as such, at decision block 304 the access control list engine 204a would determine that the destination address(es) in the access control list 504b include the IP address of the networking device 204. If, at decision block 304, it is determined that the destination addresses in the access control list do not include an IP address of the networking device, the method 300 proceeds to block 306 where the access control list is added to the networking device. In an embodiment of block 306, the first administrator IHS 202 and the networking device 204 may operate according to the session 402 to execute the access control list application instruction 504c and apply the access control list 504b on the interface 204d of the networking device 204 in the networking device address configuration section 504a to add the access control list 504b to the device configuration of the networking device 204 and make the access control list 504*b* active using methods known in the art.

Figure 6:
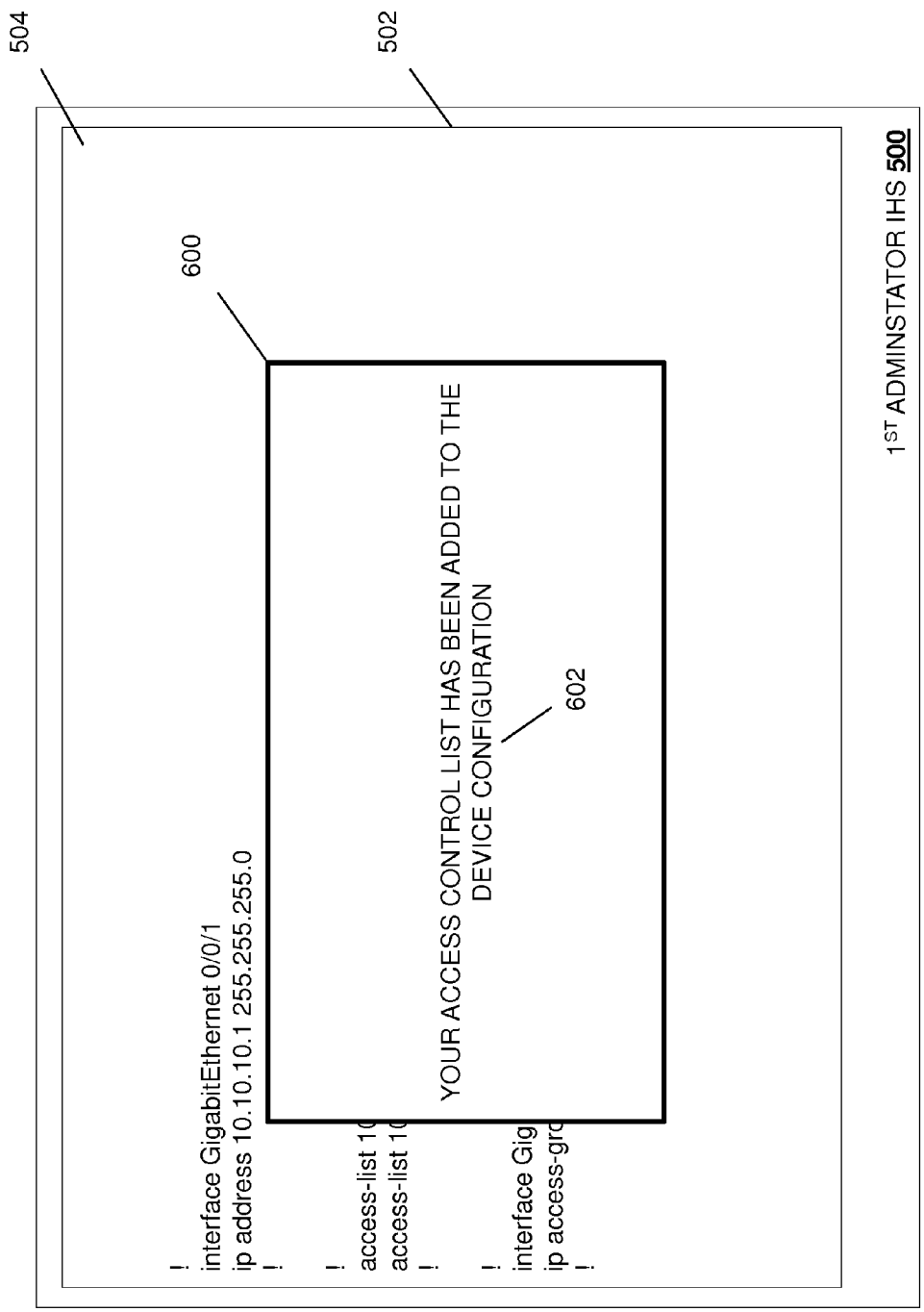
FIG. 6 is a screen shot view illustrating an embodiment of an administrator IHS displaying an access control list acceptance screen.

Referring now to FIG. 6, the first administrator IHS 500 that was used to provide the access control list input screen 504 in FIG. 5 is illustrated displaying an access control list acceptance screen 600 that may be provided at block 306 of the method 300. The illustrated embodiment of the access control list acceptance screen 600 provides an access control list acceptance message 602 that indicates to the administrator user of the first administrator IHS 500 that the access control list has been added to the configuration of the networking device 204. The access control list acceptance screen 600 may be provided by the access control list engine 204*a* over the network 206 and, as illustrated, may be displayed by the first administrator IHS 500 on the display device 502 overlaying the access control list input screen 504 (e.g., following the provision by the administrator user of the access control list instruction 504*c* and the addition of the access control list 504*b* to the device configuration of the networking device 204). However, any other methods for indicating to an administrator user that an access control list has been added to the configuration of a networking device are envisioned as falling within the scope of the present disclosure.

If, at decision block 304, it is determined that the destination addresses in the access control list includes an IP address of the networking device, the method 300 may then proceed to decision block 308 where it is determined whether address(es) of IHS(s) are entering the networking device via an interface to which the access control list is to be applied. In some embodiments, the access control list lockout prevention system 200 may only be concerned with preventing lockouts of administrator IHSs, and at decision block 308 it may only be determined whether address(es) of the administrator IHS(s) 202 and/or 208 are entering the networking device 204. However, in other embodiments, the access control list lockout prevention system 200 may be concerned with preventing lockouts of any IHSs, and at decision block 308 it may be determined whether (es) address of any IHS(s) (e.g., the administrator IHSs 202, 208 and/or the user IHSs 210) are entering the networking device 204.

In an embodiment of decision block 308, the access control list engine 204*a* may access a routing table in the networking device 204 and determine whether source/IP address(es) of IHS(s) are included in that routing table in association with the interface to which the access control list will be applied. For example, the access control list engine 204*a* may use a "longest match rule" to determine whether the IP address of the first administrator IHS 202 (i.e., 10.10.20.33 in out example) is being learned off of the interface 204*d* to which the access control list 504*b* will be applied. Using the example of the access control list 504*b* in FIG. 5 and the embodiment 400 of the access control list lockout prevention system 200 discussed above, the first administrator IHS 202 and the second administrator IHS 208 are communicatively connected to the interface 204*d*, and thus at decision block 308 it would be determined that the IP addresses of the first administrator IHS 202 and the second administrator IHS 208 are entering the interface 204*d* (i.e., interface "GigabitEthernet 0/0/1") to which the access control list 504*b* will be applied. If at decision block 308 it is determined that no IHS address(es) (or no administrator IHS address(es)) are entering the networking device via the interface to which the access control list will be applied, the method 300 proceeds to block 306 where the access control list is added to the networking device (and in some embodiments, the access control list acceptance screen 600 of FIG. 6 is provided) as discussed above.

If, at decision block 308, it is determined that IHS address(es) (or administrator IHS address(es)) are entering the networking device via the interface to which the access control list will be applied, the method 300 then proceeds to decision block 310 where it is determined whether those address(es) of the IHS(s) are subject to an access control list permit statement prior to being subject to an access control list deny statement in the access control list. In some embodiments, the access control list lockout prevention system 200 may only be concerned with preventing lockouts of administrator IHSs, and at decision block 308 it may only be determined whether the address(es) of the administrator IHS(s) determined at decision block 308 are subject to a permit statement prior to being subject to a deny statement in the access control list. However, in other embodiments, the access control list lockout prevention system 200 may be concerned with preventing lockouts of any IHSs, and at decision block 308 it may be determined whether the address(es) of any IHS(s) determined at decision block 308 (e.g., the administrator IHSs 202, 208 and/or the user IHSs 210) are subject to a permit statement prior to being subject to a deny statement in the access control list.

In an embodiment of decision block 310, the access control list engine 204*a* may perform a bit-wise comparison of the source/IP address(es) of each IHS determined at decision block 308 with the statements in the access control list 504*b* in the order that they appear in order to determine whether those IP addresses are subject to permit statements prior to being subject to a deny statement in the access control list 504*b*. For example, the access control list engine 204*a* may compare the IP address of the first administrator IHS 202 (i.e., 10.10.20.33 in our example) to the permit statements (i.e., "access-list 10 permit ip 10.10.11.0 0.0.0.255 10.0.0.0 0.255.255.255" and "access-list 10 permit ip 10.10.12.0 0.0.0.255 10.0.0.0 0.255.255.255" in our example) in the access control list 504*b* to determine whether the administrator IHS 202 is subject to those permit statements prior to being subject to the implicit deny statement in the access control list 504*b*, discussed above. One of skill in the art will recognize that, in such an example, the IP address of the first administrator IHS 202 (10.10.20.33) is not subject to either of permit statements in the access control list 504*b* (i.e., because they only permit IP addresses starting with 10.10.11.x and 10.10.12.x). However, assuming the second administrator IHS 208 has an IP address of 10.10.11.40 or 10.10.12.22, the access control list engine 204*a* would determine that the IP address for the second administrator IHS 208 is subject to a permit statement prior to being subject to a deny statement in the access control list 504*b*. If at decision block 310 it is determined that each of the IHS address(es) (or administrator IHS address(es)) determined at decision block 308 are subject to a permit statement prior to being subject to a deny statement in the access control list, the method 300 proceeds to block 306 where the access control list is added to the networking device (and in some embodiments, the access control list acceptance screen 600 of FIG. 6 is provided) as discussed above.

If, at decision block 310, it is determined that one or more of the IHS address(es) (or administrator IHS address(es)) are not subject to a permit statement prior to being subject to a deny statement in the access control list, the method 300 proceeds to decision block 314 where it is determined whether those one or more address(es) of the IHS(s) are subject to a deny statement in the access control list. In some embodiments, the access control list lockout prevention system 200 may only be concerned with preventing lockouts of administrator IHSs, and at decision block 314 it may only be determined whether the one or more address(es) of the administrator IHS(s) determined at decision block 310 are subject to a deny statement in the access control list. However, in other embodiments, the access control list lockout prevention system 200 may be concerned with preventing lockouts of any IHSs, and at decision block 314 it may be determined whether the one or more address(es) of any IHS(s) determined at decision block 310 (e.g., the administrator IHSs 202, 208 and/or the user IHSs 210) are subject to a deny statement in the access control list.

In an embodiment of decision block 314, the access control list engine 204a continues to perform the bit-wise comparison of the one or more source IP address(es) of the IHS(s) determined at decision block 310 with the statements in the access control list 504b in the order that they appear following the permit statement analysis of decision block 310 in order to determine whether those IP addresses are subject to deny statements in the access control list 504b. As discussed above, the access control list 504b of FIG. 5 includes an implicit deny statement that denies all IP addresses that are not permitted by its permit statements (i.e., "access-list 10 permit ip 10.10.11.0 0.0.0.255 10.0.0.0 0.255.255.255" and "access-list 10 permit ip 10.10.12.0 0.0.0.255 10.0.0.0 0.255.255.255" in our example), and at block 314, upon reaching that implicit deny statement, the access control list engine 204a will determine that the IP address of the administrator IHS 202 is subject to the implicit deny statement. However, in other embodiments, the access control list may include explicit deny statements (e.g., "access-list 10 deny ip 10.10.20.0 0.0.0.255 10.0.0.0 0.255.255.255") that include the IP address of the administrator IHS 202. If at decision block 314 it is determined that the one or more IHS address(es) (or administrator IHS address(es)) determined at decision block 310 are not subject to a deny statement in the access control list, the method 300 proceeds back to block decision block 310 where it is determined whether the address(es) of the IHS(s) are subject to an access control list permit statement prior to being subject to an access control list deny statement in the access control list. In this manner, the access control list engine 204a moves through the permit statements and the deny statements in the access control list to determine how they apply to the addresses of the IHSs entering the interface of the networking device to which the access control list is to be applied.

If at decision block 314 it is determined that at least one of the one or more IHS source address(es) (or administrator IHS source address(es)) determined at decision block 310 are subject to a deny statement in the access control list, the method 300 proceeds to block 312 where a warning is provided on the administrator IHS that provided the access control list. In an embodiment, the access control engine 204a in the networking device 204 provides a warning message over the network 206 for display on the first administrator IHS 202.

Figure 7:
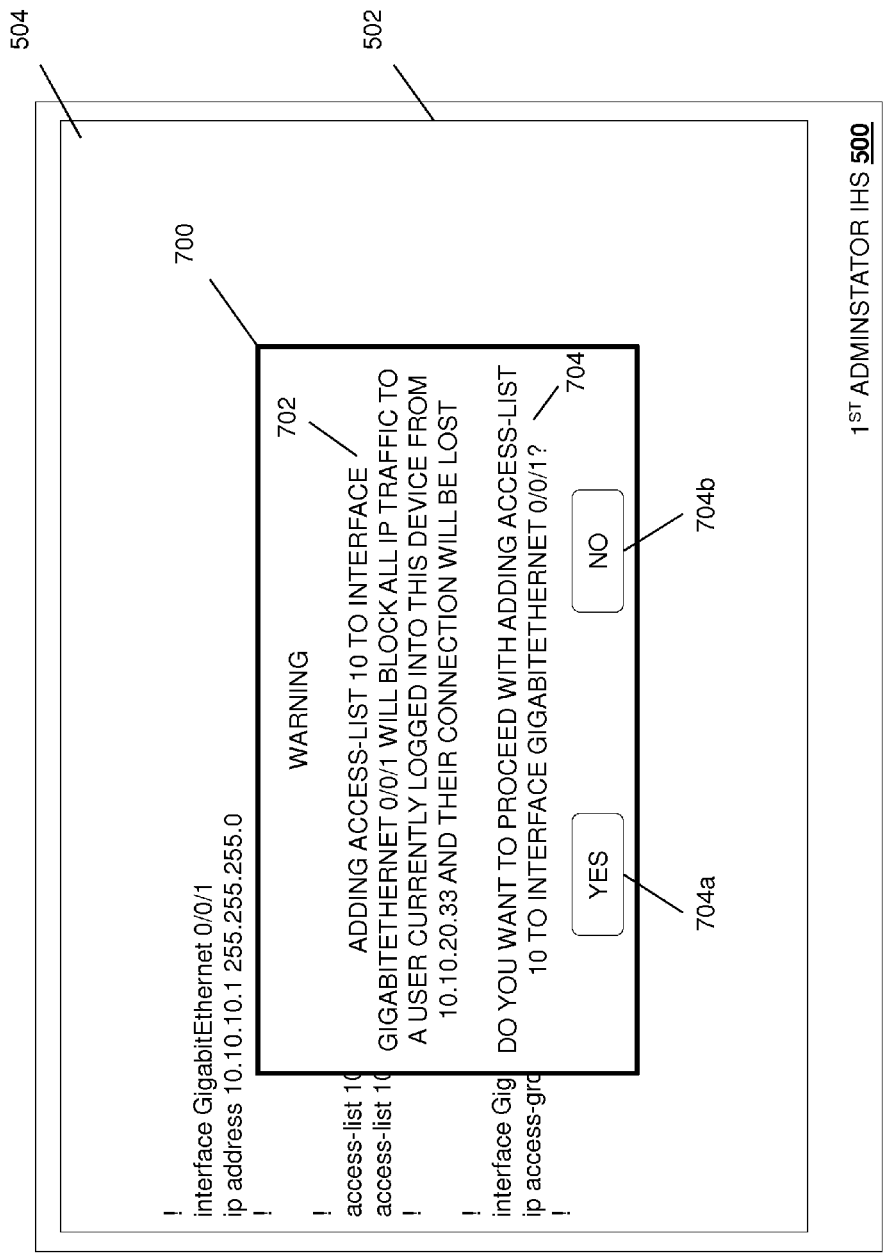
FIG. 7 is a screen shot view illustrating an embodiment of an administrator IHS displaying an access control list warning screen.

Referring now to FIG. 7, the first administrator IHS 500 that was used to provide the access control list input screen 504 in FIG. 5 is illustrated displaying an access control list warning screen 700 that may be provided at block 312 of the method 300. The illustrated embodiment of the access control list warning screen 700 provides an access control list warming message 702 that indicates to the administrator user of the first administrator IHS 500 that adding the access control list that was provided to the interface specified in the access control list will block access to a user that is currently logged into the networking device. In the illustrated example, the access control list warming message 702 indicates to the administrator user of the first administrator IHS 500 that adding the access control list 504b (i.e., "access-list 10") to the interface 204d (i.e., interface "GigabitEthernet 0/0/1") will block all IP traffic from the administrator user of the first administrator IHS 202/500 that is logged into the networking device 204 (from the IP address 10.10.20.33) and their connection will be lost. While an example of an access control list warning screen 700 that warns the administrator user of the first administrator IHS 500 that they are about to lock themselves out of the networking device 204 that they are configuring with the access control list 504b is provided, one of skill in the art in possession of the present disclosure will recognize that the access control list warning screen 700 may warn the administrator user of the first administrator IHS 500 that they are about to lock any IHS (or administrator IHS) out of the networking device 204 that they are configuring with the access control list 504b. The access control list warning screen 700 also includes a confirmation message 704 that asks the administrator user of the first administrator IHS 500 whether they would like to proceed with adding the access control list to the interface 204d on the networking device 204 (i.e., whether they want to proceed with adding "access-list 10" to the "GigabitEthernet 0/0/1"), along with a yes selector 704a and a no selector 704b.

The access control list warning screen 700 may be provided by the access control list engine 204a and, as illustrated, may be displayed by the first administrator IHS 500 on the display device 502 overlaying the access control list input screen 504 (e.g., following the provision by the administrator user of the access control list instruction 504c and the determination by the access control list engine 204a that the access control list 504b will cause an IHS that is communicatively connected to the networking device 204 to lose access to the networking device 204). However, any other methods for indicating to an administrator user that an IHS that is communicatively connected to a networking device will lose access to that networking device are envisioned as falling within the scope of the present disclosure. In response to the administrator user of the first administrator IHS 500 selecting the yes selector 704a in the confirmation message 704 (e.g., because the administrator user of the first administrator IHS 500 would like to block access to the user IHS and/or administrator IHS that is communicatively connected to the networking device and that is subject to a denial of access to the networking device via the access control list), the access control list may be added to the networking device as discussed above with reference to block 306 and, in some embodiments, the access control list acceptance screen 600 of FIG. 6 may be provided.

Figure 8:
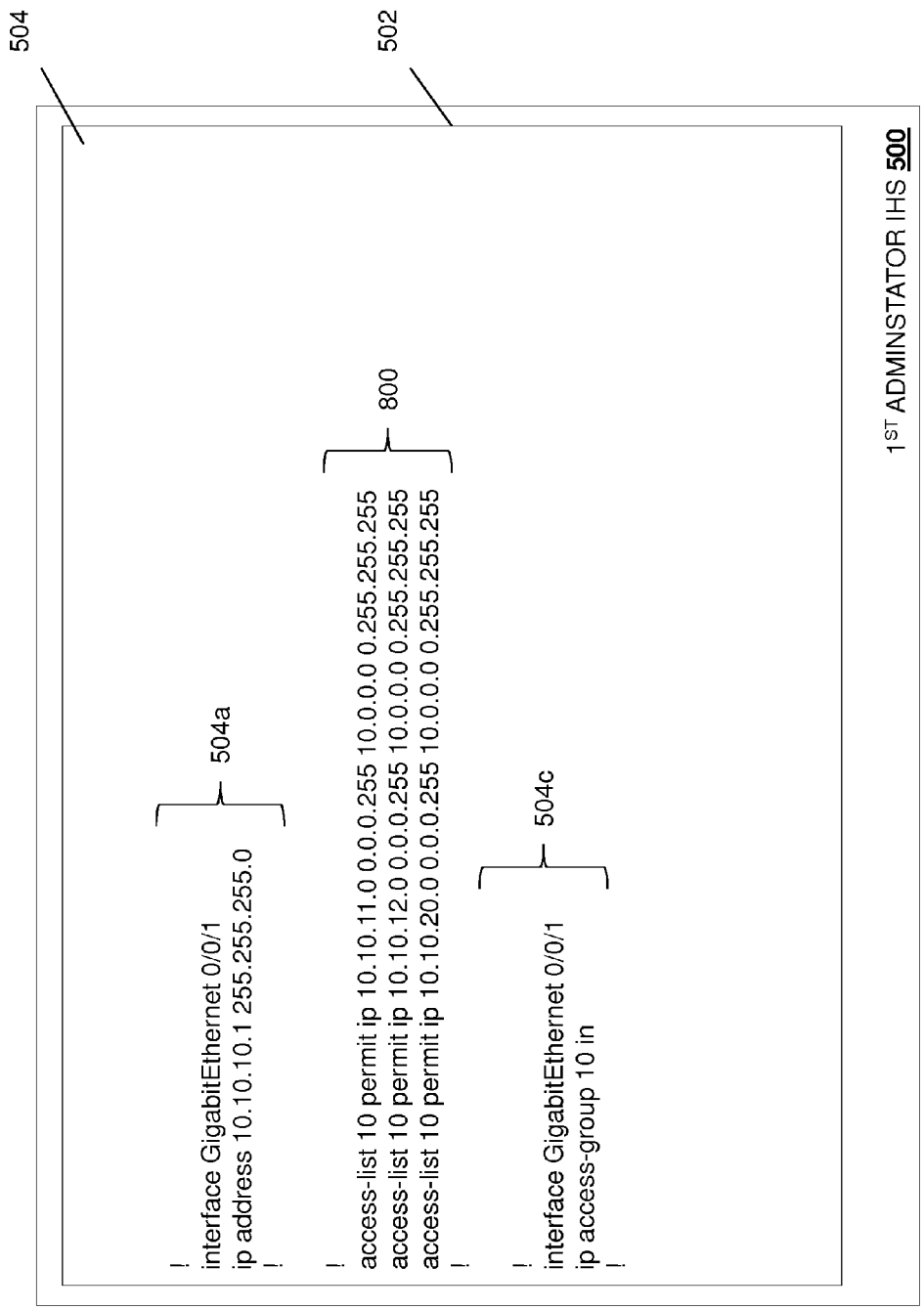
FIG. 8 is a screen shot view illustrating an embodiment of an administrator IHS being used to correct an access control list.

Referring now to FIG. 8, in response to the administrator user of the first administrator IHS 500 selecting the no selector 704b in the confirmation message 704, the access control list input screen 504 may again be provided on the display device 502 of the first administrator IHS 500 in order to allow the administrator user to correct the access control list 504b that was determined would cause an IHS that is communicatively connected to networking device 204 to lose access to that networking device 204. FIG. 8 illustrates the access control list input screen 504 that includes an access control list 800 that was modified by the administrator user (e.g., from the access control list 504b illustrated in FIG. 5) to add a permit statement (i.e., "access-list 10 permit ip 10.10.20.0 0.0.0.255 10.0.0.0 0.255.255.255") that, in our example, will allow the first administrator IHS 202/500 to continue to access the networking device 204 upon addition of the access control list 800 to the configuration of the networking device 204 (i.e., because that permit statement allows any IP addresses that start with 10.10.20.x, and the IP address of the first administrator IHS 500 is 10.10.20.33). One of skill in the art will recognize that the administrator user may modify an access control list in a variety of manners known in the art (e.g., by adding other permit statements, modifying or removing deny statements, etc.) to ensure access for any IHS that they would like to have continued access to a networking device while remaining within the scope of the present disclosure.

Thus, systems and methods have been described that provide for the analysis of an access control list, the networking device to which is will be applied, and the IHSs that are connected to that networking device, prior to the application of that access control list in order to determine whether that access control list will cause any of the IHSs that are connected to that networking device to lose access to that networking device. When an administrator user attempts to configure a networking device with an access control list that will cause their user IHS (or other user IHSs connected to that networking device) to lose access to that networking device (i.e., the application of the access control list will deny traffic to or from the IP address of that user IHS), the systems and methods of the present disclosure will warn that administrator user so that the administrator user can modify the access control list to ensure that their user IHS will have continued access to that networking device upon being configured with the modified access control list. Such systems and methods save time, reduce losses in productivity, and prevent embarrassment for administrator users that otherwise might incorrectly configure a networking device with an access control list and subsequently lock themselves out of that networking device such that they require help to regain access.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An access control list lockout prevention system, comprising:
   a network;
   a first administrator Information Handling System (IHS) that is coupled to the network; and
   a networking device that is communicatively connected to the first administrator IHS through the network, wherein the networking device is configured to:
   receive an access control list instruction from the first administrator IHS through the network;
   determine that at least one administrator IHS Internet Protocol (IP) address of a respective administrator IHS that is communicatively connected to the networking device is subject to an access control list deny statement in the access control list instruction and is not subject to an access control list permit statement in the access control list instruction; and
   send a warning message through the network to the first administrator IHS in response to determining that the at least one administrator IHS IP address is subject to the access control list deny statement in the access control list instruction and is not subject to the access control list permit statement in the access control list instruction, wherein the warning message is configured to display a warning on the first administrator IHS that each respective administrator IHS having the at least one administrator IHS IP address will lose access to the networking device if the access control list instruction is executed.

2. The access control list lockout prevention system of claim 1, wherein the determining that the at least one administrator IHS IP address is subject to the access control list deny statement in the access control list instruction and is not subject to the access control list permit statement in the access control list instruction further includes:
   determining that an address of the networking device is included as a destination address in the access control list instruction.

3. The access control list lockout prevention system of claim 1, wherein determining that the at least one administrator IHS IP address is subject to the access control list deny statement in the access control list instruction and is not subject to the access control list permit statement in the access control list instruction further includes:
   determining that the at least one administrator IHS IP address is included in a routing table of the networking device in association with an interface on the networking device to which the access control list instruction applies.

4. The access control list lockout prevention system of claim 1, wherein the at least one administrator IHS IP address is a first administrator IHS IP address of the first administrator IHS.

5. The access control list lockout prevention system of claim 1, wherein determining that the at least one administrator IHS IP address is subject to the access control list deny statement in the access control list instruction and is not subject to the access control list permit statement in the access control list instruction further includes:
   determining that the at least one administrator IHS IP address is subject to an implicit access control list deny statement in the access control list instruction.

6. The access control list lockout prevention system of claim 1, wherein the at least one administrator IHS IP address is a second administrator IHS IP address of a second administrator IHS that is communicatively connected to the networking device through the network.

7. An information handling system (IHS), comprising:
   a communication system that is configured to couple to a network;
   a processing system that is coupled to the communication system;
   a memory system that is coupled to the processing system and that includes instructions that, when executed by the processing system, cause the processing system to provide an access control list engine that is configured to:
   receive an access control list through the network that is directed to a networking device and that is provided by a first administrator IHS that is coupled to the communication system;
   determine that at least one administrator IHS Internet Protocol (IP) address of a respective administrator IHS that is communicatively connected to the networking device is subject to an access control list deny statement in the access control list and is not subject to an access control list permit statement in the access control list; and send a warning message through the network via the communication system to the first administrator IHS in response to determining that the at least one administrator IHS IP address is subject to the access control list deny statement in the access control list and is not subject to the access control list permit statement in the access control list, wherein the warning message is configured to display a warning on the first administrator IHS that each respective administrator IHS having the at least one administrator IHS IP address will lose access to the networking device if the access control list is applied.

8. The IHS of claim 7, wherein the determining that the at least one administrator IHS IP address is subject to the access control list deny statement in the access control list and is not subject to the access control list permit statement in the access control list further includes:
determining that an address of the networking device is included as a destination address in the access control list.

9. The IHS of claim 7, wherein the determining that the at least one administrator IHS IP address is subject to the access control list deny statement in the access control list and is not subject to the access control list permit statement in the access control list further includes:
determining that the at least one administrator IHS IP address is included in a routing table of the networking device in association with an interface on the networking device to which the access control list applies.

10. The IHS of claim 7, wherein the at least one administrator IHS IP address is a first administrator IHS IP address of the first administrator IHS.

11. The IHS of claim 7, wherein the determining that the at least one administrator IHS IP address is subject to the access control list deny statement in the access control list and is not subject to the access control list permit statement in the access control list further includes:
determining that the at least one administrator IHS IP address is subject to an implicit access control list deny statement in the access control list.

12. The IHS of claim 7, wherein the at least one administrator IHS IP address is a second administrator IHS IP address of a second administrator IHS that is communicatively connected to the networking device.

13. The IHS of claim 7, wherein the warning message is configured to display a request to confirm or deny the application of the access control list.

14. A method for providing access control lists, comprising:
receiving, by an access control list engine through a network, an access control list that is directed to a networking device;
determining, by the access control list engine, that at least one administrator information handling system (IHS) Internet Protocol (IP) address of a respective administrator IHS that is communicatively connected to the networking device through the network is subject to an access control list deny statement in the access control list and is not subject to an access control list permit statement in the access control list; and
sending, by the access control list engine through the network, a warning message in response to determining that the at least one administrator IHS IP address is subject to the access control list deny statement in the access control list and is not subject to the access control list permit statement in the access control list, wherein the warning message is configured to display a warning on a warning display device that each respective administrator IHS having the at least one administrator IHS IP address will lose access to the networking device if the access control list is applied.

15. The method of claim 14, wherein the determining that the at least one administrator IHS IP address is subject to the access control list deny statement in the access control list and is not subject to the access control list permit statement in the access control list further includes:
determining, by the access control list engine, that an address of the networking device is included as a destination address in the access control list.

16. The method of claim 14, wherein determining that the at least one administrator IHS IP address is subject to the access control list deny statement in the access control list and is not subject to the access control list permit statement in the access control list further includes:
determining, by the access control list engine, that the at least one administrator IHS IP address is included in a routing table of the networking device in association with an interface on the networking device to which the access control list applies.

17. The method of claim 14, wherein the at least one administrator IHS IP address is a first administrator IHS IP address of a first administrator IHS that provided the access control list to the access control list engine.

18. The method of claim 14, wherein determining that the at least one administrator IHS IP address is subject to the access control list deny statement in the access control list and is not subject to the access control list permit statement in the access control list further includes:
determining, by the access control list engine, that the at least one administrator IHS IP address is subject to an implicit access control list deny statement in the access control list.

19. The method of claim 14, wherein the at least one administrator IHS IP address is a second administrator IHS IP address of a second administrator IHS that is communicatively connected to the networking device and that did not provide the access control list to the access control list engine.

20. The method of claim 14, wherein the warning message is configured to display a request to confirm or deny the application of the access control list.

\* \* \* \* \*